United States Patent

[11] 3,620,415

| [72] | Inventor | Arthur P. Ruth<br>2302 Brookmere, Houston, Tex. |
|---|---|---|
| [21] | Appl. No. | 818,716 |
| [22] | Filed | Apr. 23, 1969 |
| [45] | Patented | Nov. 16, 1971 |

[54] TIMED MATERIAL-DISPENSING MECHANISM UTILIZING ACCUMULATION OF A LIQUID
11 Claims, 5 Drawing Figs.

[52] U.S. Cl. .................................................. 222/57,
222/363, 185/29, 58/2, 60/10
[51] Int. Cl. ............................................... G01f 11/10
[50] Field of Search .................................... 60/1, 6, 7,
8, 9, 10; 60/55; 185/29; 58/1, 2

[56] References Cited
UNITED STATES PATENTS

| 583,786 | 6/1897 | Bruun | 222/57 UX |
| 3,194,437 | 7/1965 | Toelke | 222/57 |
| 3,204,821 | 9/1965 | Fann | 222/57 X |
| 304,072 | 8/1884 | Buell | 58/2 X |
| 389,515 | 9/1888 | Iske | 60/10 |
| 1,125,594 | 1/1915 | Plumer | 60/10 |
| 1,520,204 | 12/1924 | Opich | 58/2 |
| 2,375,568 | 5/1945 | McAuliffe | 58/2 |
| 3,281,015 | 10/1966 | Streb | 222/57 |
| 3,346,144 | 10/1967 | Hings | 222/57 |

*Primary Examiner*—Robert B. Reeves
*Assistant Examiner*—Frederick R. Handren
*Attorney*—Donald Gunn ABSTRACT: A water wheel apparatus which includes a rotatable shaft, a first storage container adapted to be filled from a source of water or other suitable liquid at a controlled rate, the filling to require a certain time interval, and an additional or second container communicated with the first and providing starting torque for rotation of said shaft. Duplicate containers are arranged on the water wheel to provide for continued rotation or oscillation of the shaft, there being a stop means to locate the first container for refilling.

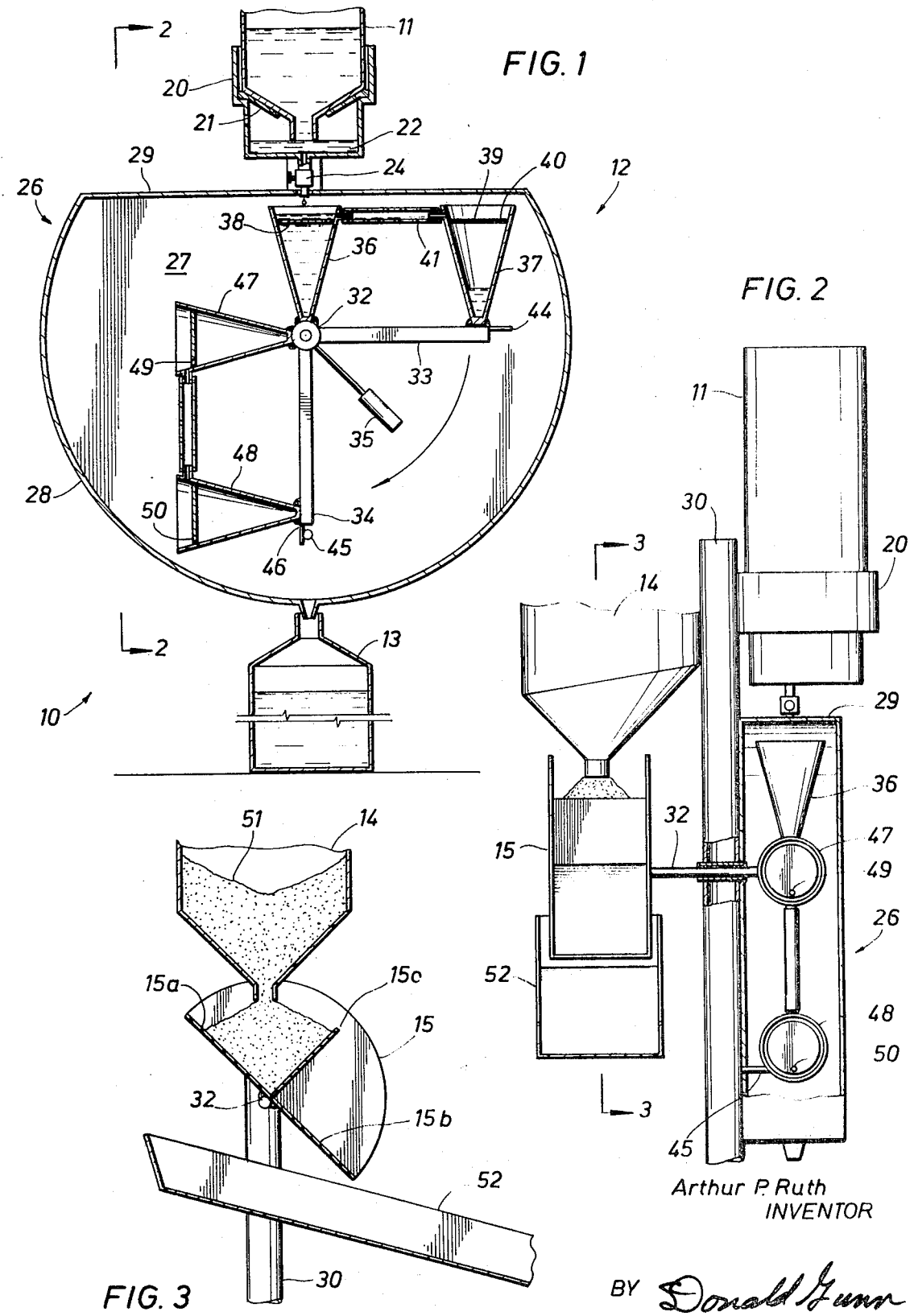

Arthur P. Ruth
INVENTOR

BY Donald Gunn

ATTORNEY

3,620,415

TIMED MATERIAL-DISPENSING MECHANISM UTILIZING ACCUMULATION OF A LIQUID

SUMMARY OF PROBLEM AND SOLUTION

The provision of a motive force at locations remote from electric power, natural gas, storage batteries and the like, has been a problem encountered from time immemorial. While numerous devices have been designed in the past operating on the principle of a water wheel, they have, nevertheless, been found wanting in the provision of a liquid device operable at a controllable slow rate which can be suitably used as a source of motive power and which can be implemented at a remote location without complicating pipes, metering devices, plumbing, and the like. The apparatus particularly finds use as a wild animal feeder or to periodically dispense vitamins or minerals in the drinking water of cattle, domestically raised catfish, and so on.

The present invention is summarized as including a rotatable shaft carrying first and second containers at selected locations. The first container is centered on a radical with respect to said shaft and is adapted to be placed beneath a source of water or other suitable liquid to be filled at a controlled time rate. The second container, cooperative with the first container, is offset from the first to provide a starting torque with respect to the shaft. The first and second containers are communicated with one another so that the filling of the second is initiated late in the timed cycle of operation of the present invention whereby the starting torque for rotation of the shaft is created. As a consequence of this, a substantial weight is placed on the shaft above the location thereof, and a suitable starting torque is created at the end of the timed cycle. The first and second containers have sufficient weight, when filled, to rotate the apparatus to a stopped position to thereby position duplicate containers for the next cycle of operation. The device may be operated in a oscillating manner or in a continuous rotational manner, dependent upon the location of the stop and suitable counterbalances.

Many objects and advantages of the present invention will become more readily apparent from a consideration of the following specification and included drawings, wherein:

FIG. 1 is a front view of the apparatus of the present invention including water or liquid sources and retrievable containers;

FIG. 2 is a sectional view taken along the line 2—2 of FIG. 1 showing the water wheel of the present invention in conjunction with a granular product dispenser;

FIG. 3 is a sectional view taken along the line 3—3 of FIG. 2 illustrating details of the feed dispenser;

Figure 4:
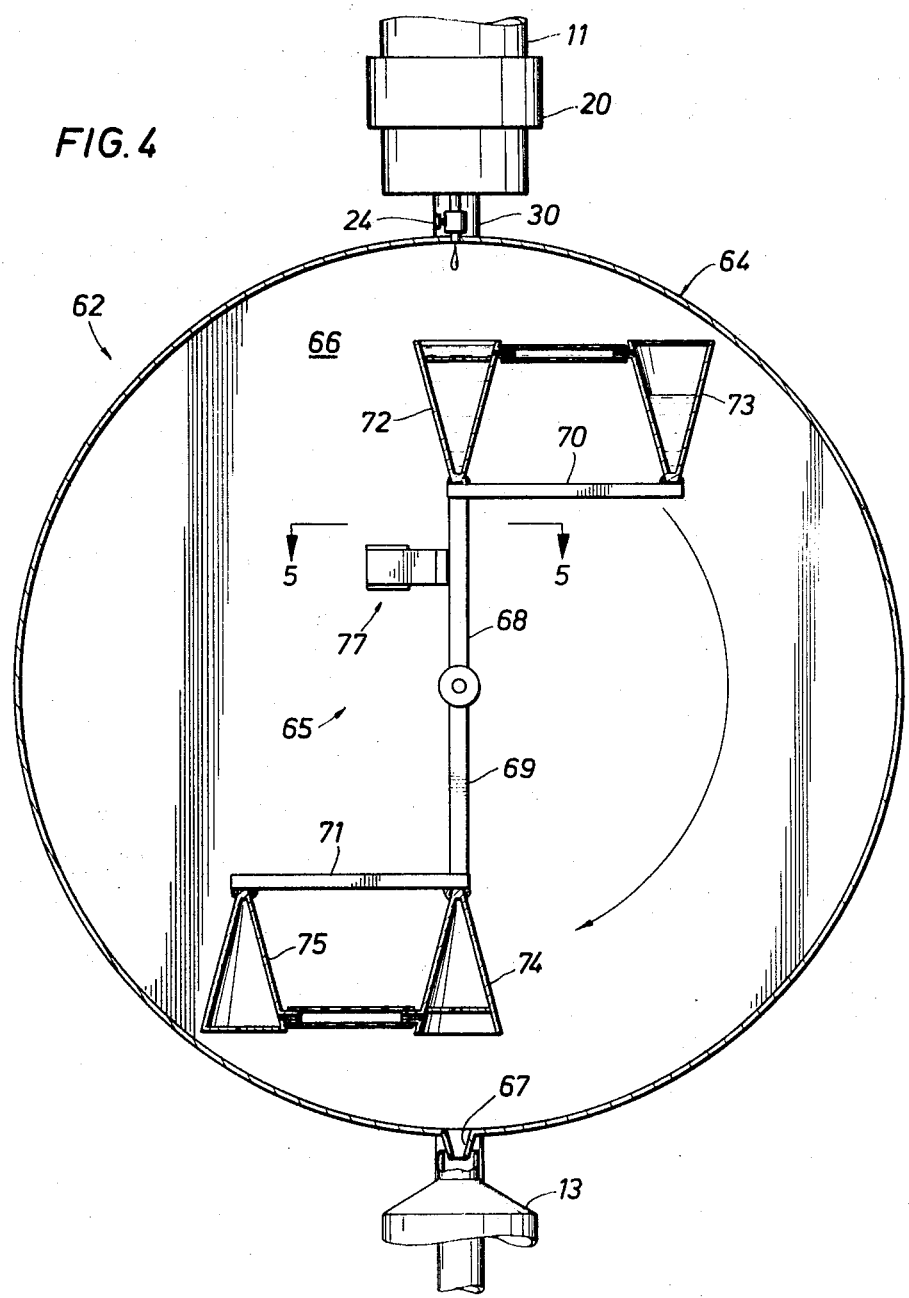
FIG. 4 is a view similar to FIG. 1 of an alternative embodiment of the present invention, the structure of FIG. 4 rotating continuously in one direction whereas the structure of FIG. 1 oscillates to and fro.

Considering the present invention broadly, attention is first directed to FIG. 1 of the drawings where the present invention is indicated by the numeral 10. A liquid container 11 is suspended above the apparatus, including a water wheel means generally indicated at 12, the water wheel apparatus being periodically oscillated by the water filling it, and a container 13 at the lower portions of FIG. 1 captures the water flowing from the water wheel 12. As shown in the side view of FIG. 2, a feed bin 14 periodically fills a measuring container 15 and dumps the feed or other granular material in timed operation governed by the water wheel means 12. Broadly, the apparatus rotates a portion of one revolution at a timed or controlled rate, each rotation being in response to the filling of the first and second containers as will be described hereinafter, each rotation being accompanied by a dumping of the liquid in the containers whereby the oscillatory timed motion is originated.

Considering the present invention more in detail, attention is directed to the water container 11 shown in the upper portions of FIG. 1. Briefly, the container 11 is adapted to hold perhaps five or ten gallons of water. Clearly other liquids may be used to avoid evaporation of the liquid or to prevent its freezing in cool climates. For instance, antifreeze liquids may be added to the liquid, not only to prevent freezing, but also to protect the metal surfaces in the apparatus from rusting. A receptacle 20 presents an open, upturned chamber 22 having an inwardly sloping shoulder 21 adapted to receive the container 11. The container 11 is preferably a plastic liquid container holding perhaps 5 to 10 gallons. It may be equipped with a handle for ease of handling. It has a narrow mouth and a shoulder which is complementary to the shoulder 21 shown in FIG. 1 so that the container 11 is easily rested with its narrow neck pointing downwardly inside the receptacle 20. The lower portions of the receptacle 20 are adapted to be partially filled with liquid. The number 22 indicates the liquid reservoir in the lower portions of the container 20, the liquid accumulating to the level of the neck of the container 11. The reservoir 22 is somewhat similar to that found in drinking water coolers typically found in office installations and the like. The liquid bubbles from the container 11 to form a partial vacuum above the body of water in the container 11. When the level in the reservoir 22 drops, it permits a bubble of air to relieve the reduced pressure in the chamber 11, thereby permitting more water to flow into the reservoir 22. Through these means, a suitably regulated head of water or other liquid is maintained in the reservoir 22 so as to maintain a consistent pressure on the remainder of the apparatus and the valve means as will be described.

Attention is next directed to a valve means 24 immediately below the reservoir 22. The valve means 24 is a suitable needle valve or any other valve of acceptable construction which controls the rate of flow of liquid from the reservoir 22. The valve is opened to drip at a controlled rate into the water wheel apparatus as will be described. It will be noted that the water or other liquid from the valve 24 drops inside of an encircling housing or chamber indicated by the numeral 26. Briefly, the chamber 26 includes a front and a backwall 27 and an encircling wall 28. The upper surface of the housing 26 is defined at 29, it being noted that the housing is generally a flat cylindrical structure except for the chord at 29 where the sidewall 28 need not be fully circular. Briefly, the housing 26 for the water wheel 12 keeps the liquid in a closed system so that it may be used and reused, as will be described, and the possibility of trash, bugs, debris, and other foreign matter being collected in the liquid is thereby reduced.

Particular note should be taken of the protective construction of the system with a view of maintaining a suitable degree of purity of the liquid. As mentioned before, water may be used, with or without additives. The container 11 is rested in the receptacle 20 and supports itself at the shoulder 21, the assembled relationship of the container 11 to the structure limiting entry of foreign matter. It is difficult, if not impossible, for trash to find its way through the receptacle 20 and past the shoulder 21 into the liquid channels. Additionally, the valve 24 drips or flows the liquid into the water wheel apparatus through a very small opening as shown in FIG. 1. Preferably, the valve 24 protrudes into the small opening in the wall 29 with a minimum of clearance so as to deny entry of foreign matter and debris into the water wheel apparatus.

Attention is momentarily directed to FIG. 2 which shows a support post 30 which supports the apparatus of the present invention. More particularly, the post 30 is connected to the receptacle 20 to center and locate the water container 11. Additionally, the housing means 26 for the water wheel is likewise joined to the post 30 by some suitable means such as nuts and bolts, welding, or the like.

A centrally located axle or shaft 32 passes through the post 30 and is supported by a suitable bushing in the post and extends through the back wall 27 of the housing means 26 to support the water wheel apparatus 12. More particularly, the shaft 32 as shown in FIG. 1 supports a first radial arm 33 and a second radial arm 34, the arms inscribing a 90° angle in FIG. 1. At a suitable midpoint between the two arms and joined to the shaft 32 is a counterbalance 35. The first radial arm 33 supports a first and second container, the containers being indicated by the numerals 36 and 37, respectively. The container 36 is adapted to receive and store a certain fluid volume. Preferably, it is conically shaped with the narrow end near the shaft 32 and a relatively large upper opening or mouth which is adapted to be positioned along a radial line beneath the valve 24 to gather or capture the liquid dripping from the valve 24. Preferably, a plate 38 is located in the container 36 near the upper end. The function of the plate 38 will be described hereinafter. It will be noted that the right-hand side of the container 36 as shown in FIG. 1 includes a small bleed hole communicating liquid which accumulates on the plate 38 into the internal storage chamber of the first container 36. The container 37 is preferably similar or even identical to the container 36, although this is not a prerequisite to operation of the present invention. The containers are preferably similar for ease and convenience of construction. Again, the numeral 39 indicates a plate extending across the mouth or upper portions of the second container 37. The numeral 40 indicates a small bleed hole which is preferably located at the right hand edge of the second container 37 for purposes to be explained.

A fluid line 41 communicates the first and second containers with one another. A suitable tap is formed on the facing sides of the first and second containers and a suitable flexible tubing or the like is communicated between them. Preferably the left hand end of the line 41 is slightly higher than the right hand end of the line 41 to provide downhill gravitational flow of liquid through the line 41 from the first container 36 to the second container 37. The first and second containers are arranged relative to one another so that the first container 36 is filled to a level sufficient to then flow water into the conduit 41. At this juncture, the container 36 is approximately full while the quantity of liquid in the second container 37 is nominal, at best only residual water or liquid from its prior use. The liquid flows downhill through the conduit 41 to fill the second container 37. It will be appreciated that it is not necessary to fully fill the container 37 inasmuch as the increase of weight in the container 37 tends to tip or rotate the water wheel apparatus 12. However, the container 37 is held in the illustrated position of FIG. 1 for a measurable period while it accumulates a substantial measure of liquid. This results from the counterbalancing effect of the containers 47 and 48 with the counterbalance 35. Consequently, the posture of FIG. 1 is retained for some period of time after the container 37 begins filling.

At some juncture, the weight of the second container 37 becomes excessive and the torque acting on the rotatable shaft 32 is measurably increased. Clearly, no torque is created by the container 36, whether empty or filled. However, the torque imposed on the shaft 32 by the weight of the second container 37 increases proportionately to the volume of liquid in the container 37 and on exceeding the breakaway frictional hold of the apparatus, starts the shaft 32 rotating in the direction of the arrow shown in FIG. 1. On rotation, the apparatus swings clockwise.

As described to this point, the first and second containers have been sufficiently filled to initiate a rotation of the apparatus. The radial arm 33 carries a stop member 44 which is contacted against a rigid or fixed postlike member 45 after one-quarter revolution, as indicated by the arrow in FIG. 1. The radial arm 34 likewise incorporates a stop 46 which maintains it in the correct position. After movement of the arm 33 to a downwardly extending position, the arm 34 is then held horizontally and the first container carried thereon, indicated by the numeral 47, is positioned beneath the valve 24 while the second container 48 is held laterally to the left of the first container on the radial arm 34. The containers 47 and 48 are similar in size, shape and function in the preferred embodiment to the containers 36 and 37. The basic differences are that the container 37 is to the right of the container 36 whereas the second container carried on the radial arm 34 is to the left of the first container. In both cases, the containers 36 and 47 are positioned approximately beneath the valve 24 and are filled by the liquid dripping from the valve.

In operation, the container 47 fills in the same manner as the container 36 filled and as described above. Then, the tube or conduit between the two containers communicates a portion of liquid to the container 48. Suitable torque is generated or created by the container 48 when it is partially filled to return the apparatus through counterclockwise rotation to the posture shown in FIG. 1. This movement is substantially like the movement described above, except that rotation is in the opposite direction. More particularly, the post 45 works with the stop means 44 and 46 to position the apparatus after its to and fro movement.

Drainage of the containers should now be considered. As described above, the containers fill slowly and the liquid is stored beneath the plates 38 and 39 previously described. As shown in the view of FIG. 1, the containers 47 and 48 are of similar construction. The small bleed holes indicated by the numerals 49 and 50 are thus positioned on the low side of the two containers in a position for substantially complete drainage of the two containers. It is helpful that the containers drain rather slowly. As they rotate about the shaft 32, drainage in too short an interval will reduce the driving torque of the apparatus and thereby possibly leave the apparatus stalled at some midpoint without any container positioned under the valve 24. Since the bleed holes 49 and 50 release the water in the two containers rather slowly, the containers keep their weight for a measurable period of time, and consequently, keep the torque on the shaft 32 until the stop engages the post 45. Then the water dribbles out slowly from the two containers and is collected in the bottom of the housing means 26 and passes through the drain holes into the additional water container 13.

From the foregoing, it will be understood how the starting torque is created by the second container on each radial arm, and as soon as the rotation of the shaft is initiated, the torque is measurably increased by the gravitational pull on the center of gravity of the first container on each radial arm. The torques combine to move the apparatus to the two positions permitted for the structure of FIG. 1.

This oscillatory to and fro movement will be used for the purposes described hereinabove and one exemplary arrangement has been shown in the drawings, including FIGS. 2 and 3. In FIG. 3, the storage bin 14 is shown filled with a granulated material 51 such as feed supplements, vitamins, minerals, and the like. The granular material pours through the bin 15 at the small neck into the dispensing and measuring means 15. The dispensing means 15 has a first compartment 15a which is shown in an upright position in FIG. 3, and a second compartment indicated by the numeral 15b. The compartment 15b is in a downwardly inclined position at this point, and consequently, empty. The compartment 15a fills to a level to stop flow through the neck of the feed bin 14. This measures a suitable quantity of granular material. The divider portion 15c shown in FIG. 3 is sufficiently short to pass just beneath the neck of the feed bin 14 when the apparatus oscillates to and fro. It will be understood that the measuring containers 15a and 15b are alternately filled and then dumped into a chute 52 which then dispenses the feed at a selected point.

Figure 5:
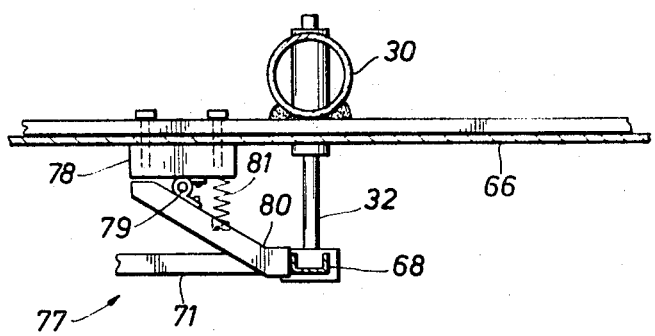
FIG. 5 shows in detail of FIG. 4.

Attention is next directed to FIG. 4 of the drawings. An alternative embodiment is indicated by the numeral 62 in the drawings. The alternative embodiment 62 is mounted on a center post 30 with a similar or identical liquid container 11 supplying liquid at a controlled rate through a valve 24. A flat cylindrical housing 64 contains the water wheel apparatus indicated generally by the numeral 65. The housing 64 is preferably circular with parallel front and backwalls, the backwall being indicated by the numeral 66. A small opening permits entry of liquid at the top from the valve 24, and a similar drain opening is provided at 67 to collect the liquid from the apparatus for storage in a similar second liquid holder 13. As shown in FIG. 5, a rotatable shaft 32 passes through the backwall 66 of the housing means 64, and a suitable sleeve in the post 30 supports the shaft 32 for rotation. The shaft 32 supports a first radial arm 68 and a second radial arm 69. As shown in FIG. 4, the radial arms are 180° from one another, and hence, can be formed of a common structural member. The radial arm 68 is joined to a structural arm 70 which supports a first container 72 and a second container 73. The radial arm 69 supports a similar structural arm 71 which supports a first container 74 and a second container 75. Preferably, the containers are similar in function and structure to those shown in FIG. 1. That is, the first container is on a radial line with respect to the shaft 32 and hence, an accumulation of liquid will increase its weight but will create no torque about the shaft 32. This is shown wherein the container 72 is filled in FIG. 4 but no torque is created causing or initiating rotation of the shaft 32. The second container 73 is communicated in a similar manner with the first container 72. When a measurable portion of the liquid is accumulated therein, torque is created acting about the shaft 32 which tends to rotate the water wheel 65 about the shaft 32. The second container provides the starting torque and when the first container is moved from the dead center position of FIG. 4, it increases the torque of the two containers in combination and accelerates the structure to cause one half revolution of rotation. That is, the container 72 is rotated to the bottom or down position and the container 74 is positioned beneath the valve 24.

Briefly, the precise positioning of the apparatus is limited by a stop means 77. The stop means 77 is shown in greater detail in FIG. 5. The stop means 77 includes a structural mounting block 78 which is bolted to the back wall 66 of the housing means 64. On the mounting block is located a hinge means 79. The hinge means 79 rotates a stop member 80 while a spring 81 tends to position the stop means 80 in its illustrated position. The position of the stop means 80 is such that the clockwise rotation causes the radial arms 68 and 69 to ride over the stop means. Since there may be a tendency of the apparatus to run past the vertical position of the radial arms as shown in FIG. 4, there is a tendency to rock backwards toward the stop means 77, at which juncture the stop means 80 abuts the radial arm and holds it at the desired position.

From the description above, both embodiments will be understood to generate a timed rotary movement. The motion may be to and fro or all in one direction as desired. Both embodiments may be used as a power source or in conjunction with feed dispensing equipment, vitamin dispensers, and the like.

The preferred embodiments shown herein are exemplary of the present invention, but clearly, many variations in structure or detail may be incorporated. Also, many factors have not been delineated inasmuch as they are matters of design detail. Matters such as materials, mode of fabrication, and size clearly fall within this category. Consequently, the foregoing is directed to the preferred embodiments and the terminology used therein is also extended to the claims.

What is claimed is:

1. Apparatus adapted for repetitively discharging fluent materials at periodic intervals and comprising: a support; material-dispensing means including a first shaft journaled on said support, and first and second material-receiving compartments circumferentially spaced around said first shaft and respectively arranged for successive movement between an upright material-retaining position and a downwardly tilted material-discharging position upon rotation of said first shaft through a selected first arc; and liquid-powered driving means including a second shaft journaled on said support, first and second liquid-receiving containers mounted outwardly from said second shaft and respectively arranged for successive movement between an upright liquid-retaining position and a downwardly tilted liquid-discharging position upon rotation of said second shaft through a selected second arc, means coupling said shafts and adapted for rotating said first shaft through said first arc upon rotation of said second shaft through said second arc, first and second liquid-receiving means mounted on said second shaft and respectively coupled to said first and second containers for conveying liquids thereto whenever said containers are in their respective upright position to successively rotate said containers between their respective positions as said containers successively receive a quantity of liquid sufficient to develop an unbalanced turning force on said second shaft, stop means adapted for releasably retaining said liquid-driving means in first and second positions to permit the successive introduction of a liquid into each of said liquid-receiving means in turn, and liquid supply means cooperatively arranged and adapted for supplying a liquid to each of said liquid-receiving means in turn.

2. The apparatus of claim 1 wherein said first and second arcs are equal.

3. The apparatus of claim 1 wherein said first and second arcs are respectively equal to about 90°.

4. The apparatus of claim 1 wherein said first and second arcs are respectively equal to about 180°.

5. The apparatus of claim 1 wherein said first and second liquid-receiving means include first and second liquid receivers, first and second liquid transfer conduits respectively coupling said first and second receivers to said first and second containers and adapted for delaying the transfer of liquids from said receivers to said containers.

6. The apparatus of claim 1 wherein said material-dispensing means further include material supply means cooperatively arranged and adapted for supplying a fluent material to each of said first and second compartments in turn as said compartments are moved to their respective upright positions.

7. Apparatus adapted for repetitively discharging fluent materials at periodic intervals and comprising: a support; material-dispensing means including a first shaft journaled on said support, first and second material-receiving compartments circumferentially spaced around said first shaft and respectively arranged for successive movement between an upright material-retaining position and a downwardly tilted material-discharging position upon rotation of said first shaft through a selected first arc, and material supply means mounted on said support above the arcuate path of said compartments and adapted for supplying a fluent material to each of said first and second compartments in turn as said compartments are respectively moved to their upright positions; and liquid-powered driving means including a second shaft journaled on said support, first and second lateral arms mounted on said second shaft and extending outwardly therefrom to define a selected second arc between their respective outer ends, first and second liquid-receiving containers respectively mounted on said first and second arms adjacent to their said outer ends and respectively arranged for successive movement between an upright liquid-retaining position and a downwardly tilted liquid-discharging position upon rotation of said second shaft through said second arc, first and second liquid receivers mounted on said second shaft and respectively arranged for successive movement between an upright liquid-holding position and a downwardly tilted liquid-draining position upon rotation of said second shaft through said second arc, first and second conduits respectively coupling said first and second liquid receivers to said first and second liquid containers and respectively adapted for conducting liquids from said receivers to said containers while each of said receivers and said containers are in their respective upright positions and a liquid has filled said upright receiver so that liquids will be transferred to said upright container for successively rotating said containers and receivers between their said positions as each of said containers successively receive a quantity of liquid sufficient to develop an unbalanced turning force on said second shaft, stop means adapted for releasably retaining said liquid-driving means in first and second positions to permit the successive introduction of a liquid into each of said receivers in turn, and liquid supply means cooperatively arranged and adapted for supplying a liquid to each of said receivers in turn.

8. The apparatus of claim 7 wherein said first and second arcs are equal.

9. The apparatus of claim 7 wherein said first and second arcs are respectively equal to about 90°.

10. The apparatus of claim 7 wherein said first and second arcs are respectively equal to about 180°.

11. The apparatus of claim 7 further including first and second covers respectively mounted on said first and second containers, and first and second orifice means in said first and second covers respectively and adapted for retarding the draining of liquids from said first and second containers as said containers respectively move to their said tilted positions.

* * * * *